United States Patent
Ozawa et al.

(10) Patent No.: US 10,681,246 B2
(45) Date of Patent: Jun. 9, 2020

(54) IMAGE READING APPARATUS, IMAGE FORMING APPARATUS, AND READING CONTROL METHOD

(71) Applicant: Konica Minolta, Inc., Tokyo (JP)

(72) Inventors: Tomohiro Ozawa, Tama (JP); Tomohiro Yamaguchi, Shinshiro (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 16/527,541

(22) Filed: Jul. 31, 2019

(65) Prior Publication Data
US 2020/0053248 A1 Feb. 13, 2020

(30) Foreign Application Priority Data
Aug. 8, 2018 (JP) .................. 2018-149000

(51) Int. Cl.
*H04N 1/04* (2006.01)
*H04N 1/409* (2006.01)
*H04N 1/407* (2006.01)
*G01N 21/94* (2006.01)

(52) U.S. Cl.
CPC ........... *H04N 1/4097* (2013.01); *G01N 21/94* (2013.01); *H04N 1/4076* (2013.01)

(58) Field of Classification Search
None
See application file for complete search history.

(56) References Cited

U.S. PATENT DOCUMENTS

| | | | | |
|---|---|---|---|---|
| 5,982,948 A * | 11/1999 | Shimada | .............. | H04N 1/1013 358/461 |
| 6,700,683 B1 * | 3/2004 | Hashizume | ........ | H04N 1/00904 358/446 |
| 7,212,320 B2 * | 5/2007 | Imoto | ................ | H04N 1/00795 358/461 |
| 9,066,053 B1 * | 6/2015 | Hyoki | .................. | H04N 1/6036 |
| 2007/0146816 A1 * | 6/2007 | Aoki | ...................... | H04N 1/401 358/474 |
| 2009/0316166 A1 * | 12/2009 | Kubo | ................... | H04N 1/4097 358/1.9 |

(Continued)

FOREIGN PATENT DOCUMENTS

| | | |
|---|---|---|
| JP | 2005-277752 A | 10/2005 |
| JP | 2012-103291 A | 5/2012 |
| JP | 2013-070163 A | 4/2013 |

*Primary Examiner* — Cheukfan Lee
(74) *Attorney, Agent, or Firm* — Osha Liang LLP (57) ABSTRACT

An image reading apparatus includes: a light source; a reference sheet that reflects light emitted from the light source; a light-receiving lens that converges the reflected light; a reading sensor that reads the light converged by the light-receiving lens; and a hardware processor that: based on first white data obtained when the reading sensor reads the reference sheet for the first time, determines whether the reference sheet or the reading sensor has dust; in response to determining that the reference sheet or the reading sensor has dust, produces ideal initial white reference data by complementing the first white data with second white data obtained when the reading sensor reads the reference sheet for the second and subsequent times; and with the ideal initial white reference data, complements third white data obtained when the reading sensor reads the reference sheet right before reading an image of a job.

19 Claims, 5 Drawing Sheets

(56) References Cited

U.S. PATENT DOCUMENTS

| | | | | |
|---|---|---|---|---|
| 2010/0177360 | A1* | 7/2010 | Shimokawa | H04N 1/401 |
| | | | | 358/461 |
| 2010/0309530 | A1* | 12/2010 | Kamei | H04N 1/00002 |
| | | | | 358/474 |
| 2011/0188092 | A1* | 8/2011 | Fukutome | H04N 1/40 |
| | | | | 358/461 |
| 2013/0293937 | A1* | 11/2013 | Kato | H04N 1/00572 |
| | | | | 358/498 |
| 2014/0268256 | A1* | 9/2014 | Mayama | H04N 1/024 |
| | | | | 358/496 |

* cited by examiner

IMAGE READING APPARATUS, IMAGE FORMING APPARATUS, AND READING CONTROL METHOD

CROSS-REFERENCE TO RELATED APPLICATION

The entire disclosure of Japanese Patent Application No. 2018-149000, filed on Aug. 8, 2018, is incorporated herein by reference.

BACKGROUND

Technical Field

The present disclosure relates to an image reading apparatus, an image forming apparatus, and a reading control method.

Description of the Related Art

There is known an image reading apparatus that is included in such as an image forming apparatus and equipped with a contact image sensor (CIS) as a reading sensor. Such an image reading apparatus has a reading unit consisting of a light source, such as a light-emitting diode(s) (LED), a light-receiving lens(es), and a reading sensor each of which is placed in a predetermined position. The image reading apparatus emits light to a document by turning on the light source, receives the light reflected from the document with the reading sensor, and thus reads an image on the document.

The image reading apparatus performs shading correction on image data in order to eliminate tone unevenness originated from uneven distribution of light quantity from the light source. More specifically, first, the image reading apparatus obtains white reference data (shading data) serving as a standard white color by: emitting light with the light source to a shading sheet that is for determining a standard white color and arranged in such a way as to face the light source; and receiving the light reflected from the shading sheet with the reading sensor. Next, in actual document-reading operation, the image reading apparatus corrects, with the obtained shading data, image data obtained by reading a document (shading correction).

Hitherto, it has been difficult to obtain dustless (no-dust-showing) shading data of the whole one line by one scan due to difficulty in perfectly removing dust on the shading sheet or the glass surface of the reading sensor by cleaning.

To cope with this, there is known an image reading apparatus that has a mechanism of obtaining shading data while moving an image reading sensor and/or a mechanism of wiping dust off. However, an image reading apparatus having such a mechanism of moving an image reading sensor and/or a mechanism of wiping dust off is structurally complex, which requires much cost.

There is disclosed, for example, in JP 2005-277752 A a technology of replacing data of dust-adhered (dust-showing) pixels with dustless shading data while taking into account a difference between an average value of data of N pixels (e.g. front 10 pixels) in front of and/or behind the dust-adhered pixels and an average value of the dustless shading data.

Furthermore, there is disclosed, for example, in JP 2012-103291 A a technology of producing sensitivity ratio distribution data by dividing dustless data (first data) by dust-adhered data (second data); modifying the second data with the sensitivity ratio distribution data; and thereafter complements dust-adhered pixel data in the second data with their corresponding dustless pixel data in the first data.

Furthermore, there is disclosed, for example, in JP 2013-070163 A a technology of replacing data of one line with initial data if the number of pieces of dust exceeds a predetermined value (ratio), and replacing only data of dust-adhered pixels with the initial data if the number of pieces of dust does not exceed the predetermined value (ratio).

However, the technology disclosed in JP 2005-277752 A is a technology of dividing a reading region of a reading sensor into three equal sections, and utilizing the average values of the respective data in each section for data complementing. In this technology, if there are many pieces of dust with a narrow space in between, influence of dust may be strongly reflected on the average value(s), and consequently generate a tone jump at the edge of the dust-adhered pixels when data replacement is performed. Using shading data having a tone jump for shading correction is prone to generate streaks on images.

Furthermore, the technology disclosed in JP 2012-103291 A may make the sensitivity ratio vary between the pixels of the data obtained by a few scans due to, for example, influence of noise on the data. Also, if pieces of dust are present on the pixels of the data with a narrow space in between, the data of the pixels that are complemented when filtered may lower their gray levels due to influence of dust nearby. Using such complemented data to replace data of dust-adhered points in pixels (pixel by pixel) is prone to generate a tone jump.

Furthermore, the technology disclosed in JP 2013-070163 A is aimed at reducing cost of complementing control. Hence, in the technology, data are replaced only either in units of one line (i.e. all the pixels) or in units of one pixel (i.e. each dust-adhered pixel). This cannot eliminate influence of dust perfectly.

SUMMARY

One or more embodiments of the present invention provide an image reading apparatus, an image forming apparatus, and a reading control method that can eliminate influence of dust on images and restrain occurrence of streaks thereon even if dust is not perfectly wiped off.

According to one more embodiments of the present invention, there is provided an image reading apparatus including: a light source that emits light; a reference member that reflects the light emitted from the light source; a light-receiving lens that converges the light reflected from the reference member; a reader that reads the light converged by the light-receiving lens; and a hardware processor that: based on first white data that is obtained by the reader reading the reference member, determines whether or not the reference member or the reader has dust; in response to determining that the reference member or the reader has dust, produces ideal initial white reference data by complementing the first white data with second white data that is obtained by the reader additionally reading the reference member; and with the produced ideal initial white reference data, complements third white data that is obtained by the reader reading the reference member right before reading an image of a job.

According to one or more embodiments of the present invention, there is provided an image forming apparatus including: the image reading apparatus; and an image former that forms, on paper, an image of a document read by the reader of the image reading apparatus.

According to one or more embodiments of the present invention, there is provided a reading control method for an image reading apparatus including: a light source that emits light; a reference member that reflects the light emitted from the light source; a light-receiving lens that converges the light reflected from the reference member; and a reader that reads the light converged by the light-receiving lens, the reading control method including: based on first white data that is obtained by the reader reading the reference member, determining whether or not the reference member or the reader has dust; in response to determining that the reference member or the reader has dust, producing ideal initial white reference data by complementing the first white data with second white data that is obtained by the reader additionally reading the reference member; and with the produced ideal initial white reference data, complementing third white data that is obtained by the reader reading the reference member right before reading an image of a job.

BRIEF DESCRIPTION OF THE DRAWINGS

The advantages and features provided by one or more embodiments of the present invention will become more fully understood from the detailed description given hereinbelow and the appended drawings that are given by way of illustration only, and thus are not intended as a definition of the limits of the present invention, wherein.

DETAILED DESCRIPTION

Hereinafter, embodiments of the present invention will be described with reference to the drawings. However, the scope of the present invention is not limited to the disclosed embodiments.

[1. Explanation of Configuration]

An image forming apparatus 1 according to one or more embodiments is a multifunction peripheral having functions such as printing, scanning, copying, and faxing. The image forming apparatus 1 forms images on sheets of paper on the basis of image data obtained by reading images on documents or received from external apparatuses.

Figure 1:
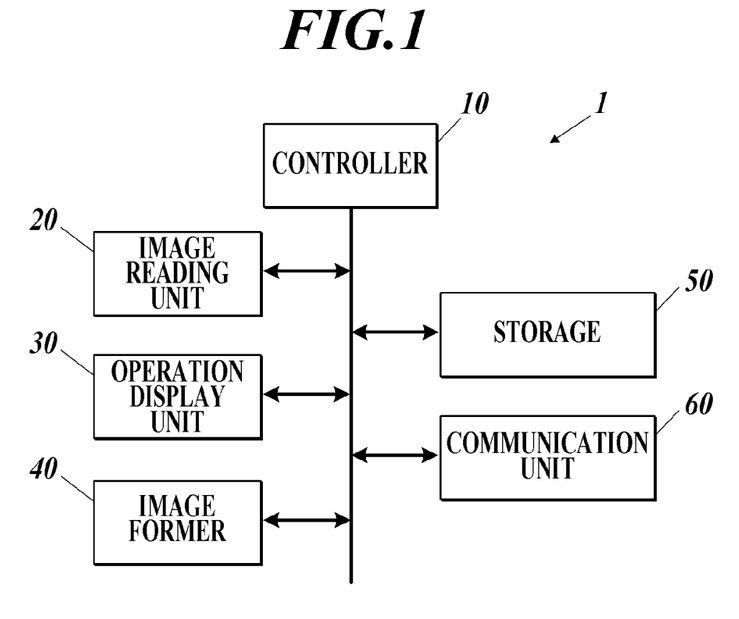
FIG. 1 shows main components of a control system of an image forming apparatus according to one or more embodiments.

As shown in FIG. 1, the image forming apparatus 1 includes a controller 10, an image reading unit 20 (image reading apparatus), an operation display unit 30, an image former 40, a storage 50, and a communication unit 60.

The controller 10 includes a CPU, a RAM, and a ROM. The CPU loads various programs (e.g. firmware) stored in the ROM into the RAM, and integrally controls operation of the image forming apparatus 1 in cooperation with the programs loaded in the RAM. The RAM stores image data and printing jobs, which are received by the image former 40, until printing thereof finishes.

The image reading unit 20 optically scans images on documents placed on a document tray or an auto document feeder (ADF) (not illustrated) with an optical system of a scanning exposure device, reads the light reflected from the images with a reading sensor (described below), and thus obtains image signals. The image signals are subjected to various types of processing, such as analog-to-digital (A/D) conversion, shading correction, and signal compression, and then transferred, as image data (document data), to the image former 40. The image data that is transferred to the image former 40 is not limited to one that is read by the image reading unit 20, and hence may be one that is received from external apparatuses (not illustrated) connected to the image forming apparatus 1 via the communication unit 60.

Figure 2:
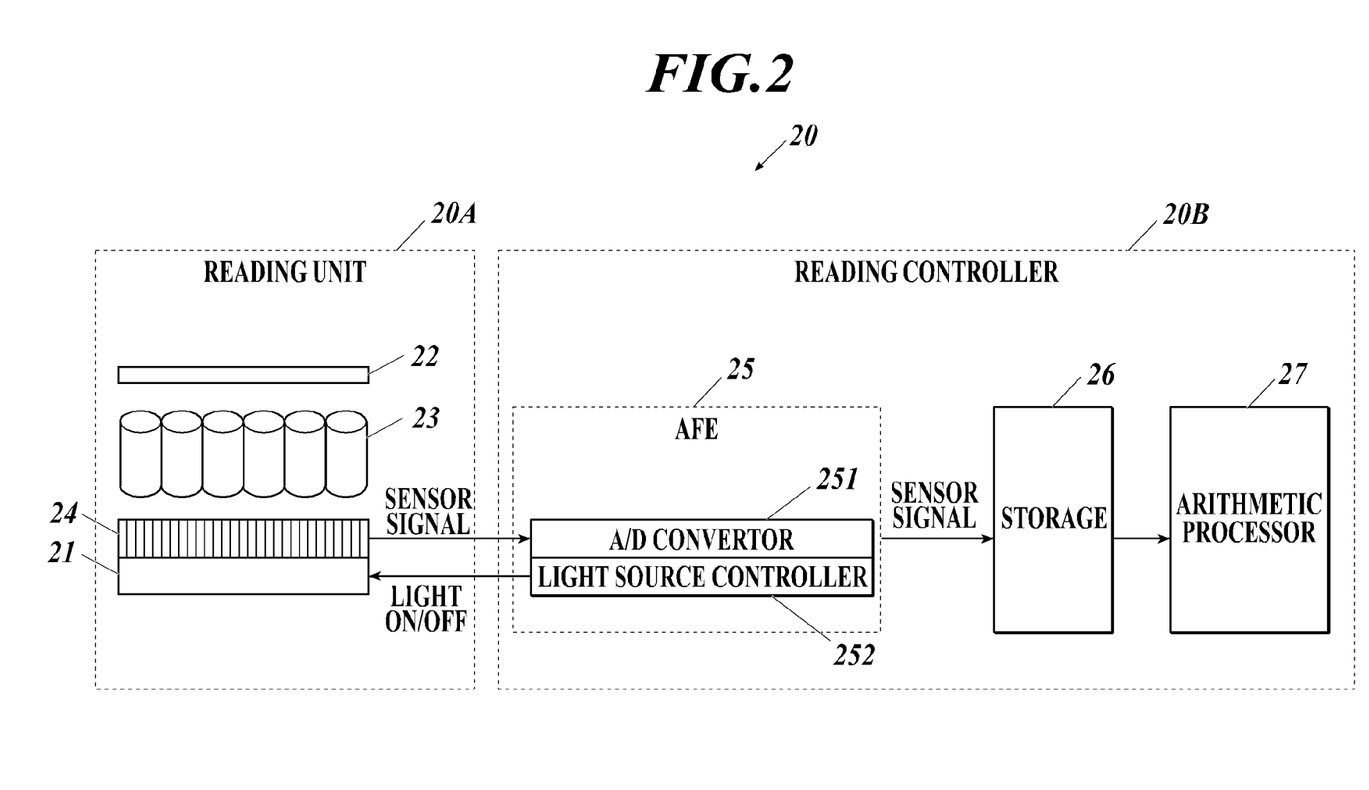
FIG. 2 shows a schematic configuration of an image reading unit according to one or more embodiments.

As shown in FIG. 2, the image reading unit 20 includes a reading unit 20A and a reading controller 20B.

The reading unit 20A includes: a light source 21 that includes a light-emitting diode(s) (LED) that emits light; a shading sheet 22 (reference sheet or reference member) that reflects the light emitted from the light source 21; a light-receiving lens(es) 23 that converges the light reflected from the shading sheet 22; and a reading sensor 24 (reader) that includes a plurality of chips (e.g. 17 chips) that read the light converged by the light-receiving lens 23.

The reading controller 20B includes an analog front end (AFL) 25, a storage 26, and an arithmetic processor 27 (hardware processor).

The AFE 25 includes: an A/D convertor 251 that digitizes sensor signals read by the reading sensor 24; and a light source controller 252 that controls on/off of the light source 21.

The storage 26 stores sensor signals digitized by the A/D convertor 251. The storage 26 stores sensor signals of the time when the light source 21 emits light to the shading sheet 22.

The arithmetic processor 27 determines whether or not the shading sheet 22 or the reading sensor 24 has dust on the basis of first white data (described below) that is obtained by the reading sensor 24 reading the shading sheet 22. If the arithmetic processor 27 determines that the shading sheet 22 or the reading sensor 24 has dust, the arithmetic processor 27 complements the first white data with second white data (described below) that is obtained by the reading sensor 24 additionally reading the shading sheet 22. Thus, the arithmetic processor 27 produces ideal initial white reference data. With the produced ideal initial white reference data, the arithmetic processor 27 complements third white data that is obtained by the reading sensor 24 reading the shading sheet 22 just before reading images of a job(s).

The operation display unit 30 includes a liquid crystal display (LCD) or an organic electro-luminescence (OEL) display. The display is provided with a pressure-sensitive (i.e. resistive) touchscreen in which transparent electrodes are arranged to be a grid.

The operation display unit 30 displays such as various setting screens, various buttons, and operation statuses of functions in accordance with display control signals input from the controller 10. When any of the buttons on the display is pressed with such as a finger or a touch pen, the operation display unit 30 detects X and Y coordinates of the pressed point by its voltage value, and outputs an operation signal(s) corresponding to the pressed point to the controller 10. The touchscreen is not limited to the pressure-sensitive type, and hence may be an electrostatic type or an optical type, for example. The operation display unit 30 is also equipped with various hard keys outside the display, and, when any of the hard keys is pressed, outputs an operation signal(s) corresponding to the pressed key to the controller 10. By manipulating the operation display unit 30, a user can do settings for image forming, such as image quality setting, zoom setting, application setting, output setting, and paper setting; make an instruction to start conveying paper (i.e. printing); and start up the image forming apparatus 1 and stop operation thereof.

The image former 40 forms images on paper on the basis of image data received from the image reading unit 20 or printing jobs received from external apparatuses via a communication network, thereby producing printed matters. The image former 40 is an electrophotographic image former that forms electrostatic latent images on charged image holders (photoreceptors), develops the electrostatic latent images with toner of respective colors, superposes the toner images of the respective colors on top of one another on an intermediate transfer body (intermediate transfer belt), and transfers the toner image onto paper.

The storage 50 includes a non-volatile memory, and stores such as various programs, various setting data, and job data in such a way to be readable by the controller 10. The storage 50 also stores such as read images, fax images, and font data.

The communication unit 60 is a communication interface that includes an integrated circuit (IC) for communication and a communication connector. Under the control of the controller 10, the communication unit 60 sends/receives various types of information to/from external apparatuses connected to the communication network, using specific communication protocols. The communication unit 60 can also input/output various types of information via a USB.

[2. Explanation of Operation]

Next, operation (initial shading data obtainment process) of the image reading unit 20 of the image forming apparatus 1 according to one or more embodiments is described with reference to the flowchart in FIG. 3. It should be noted that the shading sheet 22 and the glass surface of the reading sensor 24 are cleaned manually by a serviceperson before the image reading unit 20 scans (reads) the shading sheet 22.

Firstly, the arithmetic processor 27 controls and causes the reading unit 20A to read the shading sheet 22, and obtains white data (Step S101). In the present disclosure, the white data, which is obtained at Step S101, obtained first (i.e. at the first time of Step S101) is called "first white data", and the white data obtained second and thereafter (i.e. at the second time of Step S101 and thereafter) are called "second white data".

Next, the arithmetic processor 27 determines whether or not the shading sheet 22 or the reading sensor 24 has dust on the basis of the white data obtained at Step S101 (Step S102). More specifically, the arithmetic processor 27 determines whether or not the shading sheet 22 or the reading sensor 24 has dust, for example, by making determinations in relation to cycle(s) corresponding to distance(s) between lenses in a selfoc lens array (SLA) and/or a dynamic range, which are not affected by characteristics of the reading sensor 24.

If the arithmetic processor 27 determines that the shading sheet 22 or the reading sensor 24 has dust (Step S102: YES), the arithmetic processor 27 proceeds to Step S104.

If the arithmetic processor 27 determines that neither the shading sheet 22 nor the reading sensor 24 has dust (Step S102: NO), the arithmetic processor 27 determines the white data obtained at Step S101 to be initial shading data (initial white reference data) (Step S103), and stores the initial shading data in the storage 26 or the storage 50.

At Step S104, the arithmetic processor 27 determines whether or not the white data obtained at Step S101 is the first white data.

If the arithmetic processor 27 determines that the white data obtained at Step S101 is the first white data (S104: YES), the arithmetic processor 27 temporarily stores the first white data (data of one line) as a candidate for initial shading data (hereinafter called "initial shading data candidate") in the storage 26 (Step S105), and returns to Step S101.

If the arithmetic processor 27 determines that the white data obtained at Step S101 is not the first white data, namely is the second white data (S104: NO), the arithmetic processor 27 proceeds to Step S106.

At Step S106, if the arithmetic processor 27 determines that a pixel point(s) in the second white data, obtained at Step S101, corresponding to a dust-showing pixel point(s) in the initial shading data candidate (i.e. first white data), stored at Step S105 in the first scan, shows no dust, the arithmetic processor 27 replaces data of the dust-showing pixel point(s) in the initial shading data candidate with data of the corresponding pixel point(s) in the second white data (Step S106). The dust-showing pixel point is a pixel point based on which the arithmetic processor 27 determines that the shading sheet 22 or the reading sensor 24 has dust. Thus, if the arithmetic processor 27 determines at Step S102 that the shading sheet 22 or the reading sensor 24 has dust, the arithmetic processor 27 complements the first white data (initial shading data candidate) with the second white data (obtained at Step S101) that is obtained by the reading sensor 24 additionally reading the shading sheet 22, and thus produces ideal initial white reference data.

Next, the arithmetic processor 27 determines whether or not all the dust-showing pixel points in the initial shading data candidate (of one line) have become OK (i.e. show no dust) (Step S107).

If the arithmetic processor 27 determines that all the dust-showing pixel points in the initial shading data candidate have become OK (Step S107: YES), the arithmetic processor 27 determines the initial shading data candidate to be initial shading data, stores the initial shading data in the storage 26 or the storage 50, and ends the initial shading data obtainment process.

If the arithmetic processor 27 determines that not all the dust-showing pixel points in the initial shading data candidate have become OK yet (Step S107: NO), the arithmetic processor 27 returns to Step S101.

As described above, the image reading apparatus (image reading unit 20) of the image forming apparatus 1 includes a hardware processor (arithmetic processor 27) that: based on first white data that is obtained by a reader (reading sensor 24) reading a reference member (shading sheet 22), determines whether or not the reference member or the reader has dust; in response to determining that the reference member or the reader has dust, produces ideal initial white reference data by complementing the first white data with second white data that is obtained by the reader additionally reading the reference member; and with the produced ideal initial white reference data, complements third white data that is obtained by the reader reading the reference member right before reading an image of a job.

Thus, even if dust remains on a part of the reading sensor 24 or the shading sheet 22 due to insufficient cleaning, the image reading apparatus according to one or more embodiments can produce, by scanning the shading sheet 22 multiple times, shading data as clean as one that would be obtained by scanning the shading sheet 22 one time with neither the reading sensor 24 nor shading sheet 22 having dust. This enables shading correction with shading data having no tone jump, and consequently can eliminate influence of dust on images and restrain occurrence of streaks thereon even if dust is not perfectly wiped off.

Although one or more embodiments of the present invention have been described and illustrated in detail, the present invention is not limited to these embodiments. The above embodiments can be appropriately modified without departing from the scope of the present invention.

[First Modification]

For example, in one or more embodiments, data are replaced in pixels. However, this is not a limitation. For example, data may be replaced in chips.

A first modification of the operation of the image reading unit 20 is described hereinbelow with reference to the flowchart in FIG. 4.

Figure 3:
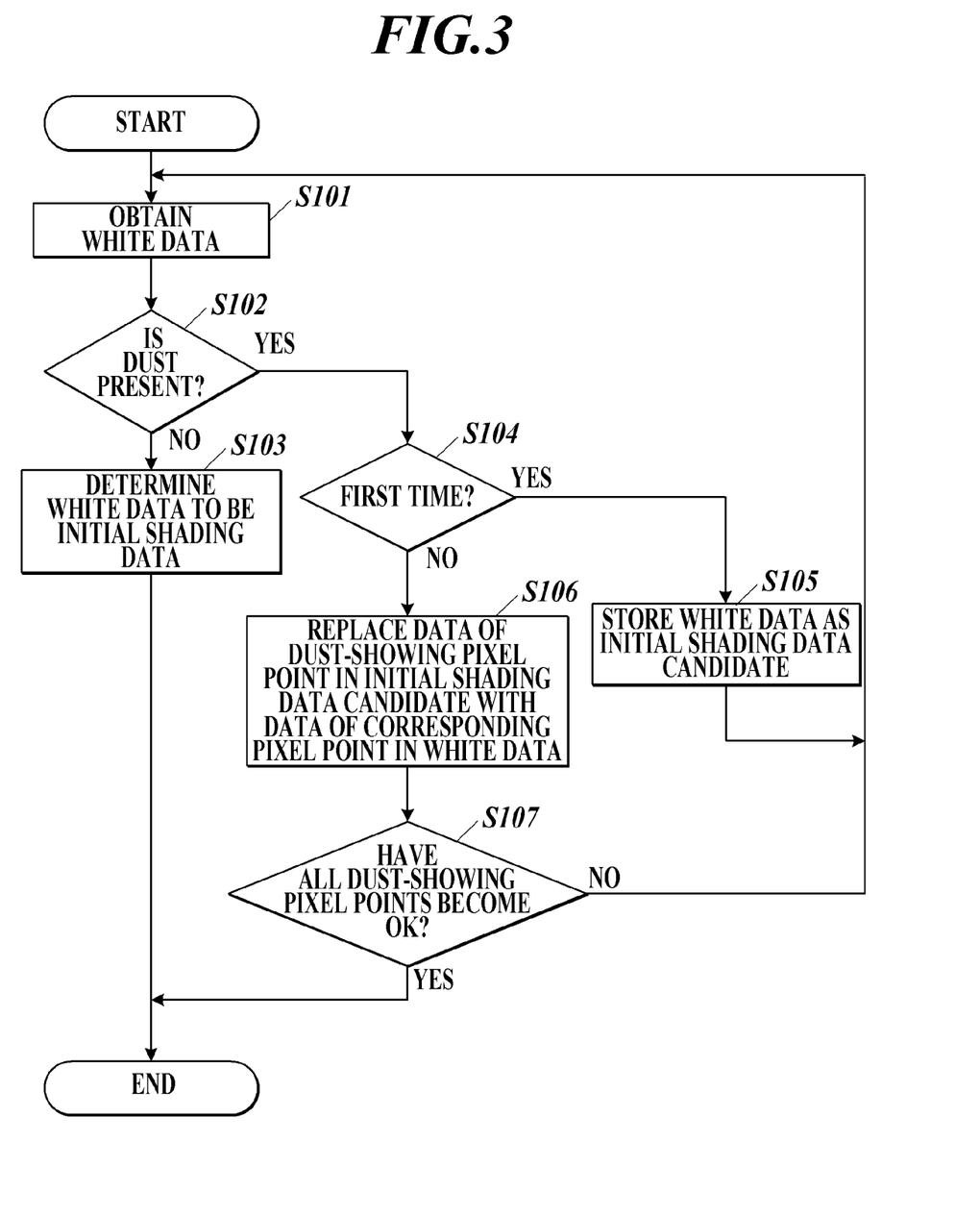
FIG. 3 is a flowchart showing an example of operation of the image reading unit according to one or more embodiments.
Figure 4:
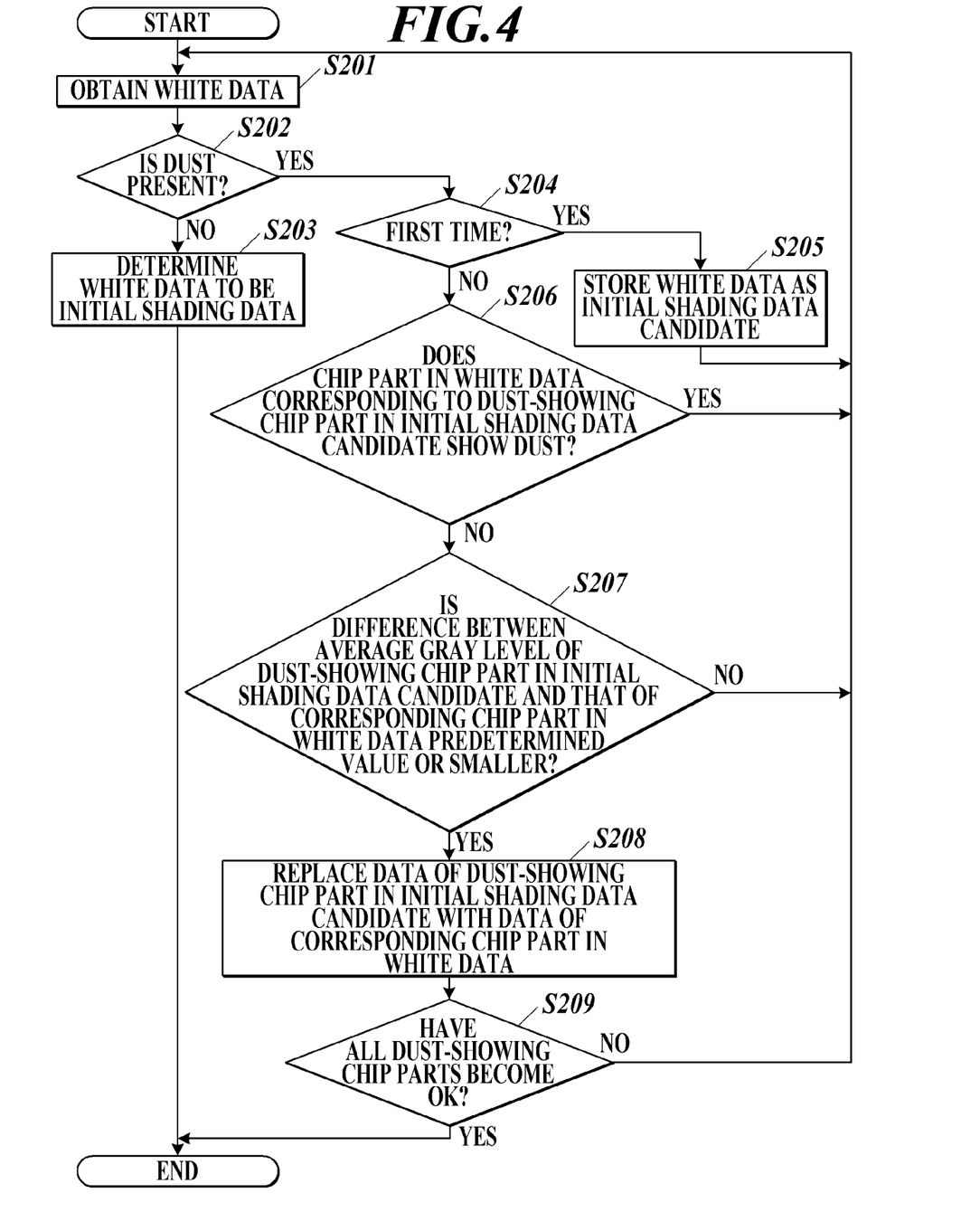
FIG. 4 is a flowchart showing a first modification of the operation of the image reading unit according to one or more embodiments.

Steps S201 to S205 in FIG. 4 are the same as Step S101 to S105 in FIG. 3, and hence not described.

At Step S206, the arithmetic processor 27 determines whether or not a chip part(s) (small region in image data) in the second white data, obtained at Step S201, corresponding to a dust-showing chip part(s) (chip part(s) including a dust-showing pixel point(s)) in the initial shading data candidate (i.e. first white data), stored at Step S205 in the first scan, shows dust (Step S206).

If the arithmetic processor 27 determines that (all) the corresponding chip part(s) in the second white data shows dust (Step S206: YES), the arithmetic processor 27 returns to Step S201.

If the arithmetic processor 27 determines that (at least one of) the corresponding chip part(s) in the second white data shows no dust (Step S206: NO), the arithmetic processor 27 proceeds to Step S207.

At Step S207, with respect to each corresponding chip part determined as showing no dust at Step S206, the arithmetic processor 27 determines whether or not a difference between an average gray level of the dust-showing chip part in the initial shading data candidate and an average gray level of the corresponding chip part in the second white data is a predetermined value or smaller. Here, the predetermined value is a value that does not generate a tone jump (e.g. a difference of three levels in 8 bits).

If the arithmetic processor 27 determines that the difference is the predetermined value or smaller (i.e. finds favorable data, which is also no-dust-showing data) (Step S207: YES), the arithmetic processor 27 replaces data of the dust-showing chip part in the initial shading data candidate with data of the corresponding chip part in the second white data (Step S208). Thus, the arithmetic processor 27 replaces dust-showing data of dust-showing chip parts in the initial shading data candidate with favorable data of no-dust-showing chip parts in the second white data, obtained at Step S201, corresponding to the dust-showing chip parts, whenever their favorable data are obtained/found.

If the arithmetic processor 27 determines that (all) the difference(s) is greater than the predetermined value (Step S207: NO), the arithmetic processor 27 returns to Step S201.

Next, the arithmetic processor 27 determines whether or not all the dust-showing chip parts in the initial shading data candidate have become OK (i.e. show no dust) (Step S209).

If the arithmetic processor 27 determines that all the dust-showing chip parts have become OK (Step S209: YES), the arithmetic processor 27 determines the initial shading data candidate to be initial shading data, stores the initial shading data in the storage 26 or the storage 50, and ends the initial shading data obtainment process.

If the arithmetic processor 27 determines that not all the dust-showing chip parts in the initial shading data candidate have become OK yet (Step S209: NO), the arithmetic processor 27 returns to Step S201.

As described above, the image reading apparatus of the image forming apparatus 1 according to the first modification includes the hardware processor that: determines whether or not a corresponding chip part in the second white data corresponding to a dust-showing chip part including a dust-showing pixel point in the first white data shows dust, wherein based on the dust-showing pixel point, the hardware processor determines that the reference member or the reader has dust; and in response to determining that the corresponding chip part in the second white data shows no dust, replaces data of the dust-showing chip part in the first white data with data of the corresponding chip part in the second white data, and the reader includes a plurality of chips.

Thus, the image reading apparatus according to the first modification replaces shading data in chips. This, as compared to replacing shading data in pixels, can maintain continuity of levels of gray in data of each chip part and restrain occurrence of a tone jump. For example, in the case of peak holding for data replacement in pixels, because data are susceptible to noise, if highly-reflective dust is present on a point of the shading sheet 22 or a pixel of the reading sensor 24, data of a pixel point corresponding to the dust-having point of the shading sheet 22 or the dust-having pixel of the reading sensor 24 tends to have a high level of gray, which is likely to result in a tone jump. Data replacement in chips instead can eliminate such noise influence on data and restrain occurrence of a tone jump.

Furthermore, in the image reading apparatus according to the first modification, in response to determining that a difference between an average gray level of the dust-showing chip part in the first white data and an average gray level of the corresponding chip part in the second white data is a predetermined value or smaller, the hardware processor replaces the data of the dust-showing chip part in the first white data with the data of the corresponding chip part in the second white data.

Thus, the image reading apparatus according to the first modification can more certainly maintain continuity of levels of gray in data of each chip part and restrain occurrence of a tone jump.

Furthermore, in the image reading apparatus according to the first modification, in response to determining that the first white data includes a plurality of dust-showing chip parts each of which is the dust-showing chip part, whenever the second white data is obtained, the hardware processor replaces, with respect to each of the dust-showing chip parts, the data of the dust-showing chip part in the first white data with the data of the corresponding chip part in the second white data determined as showing no dust.

Thus, the image reading apparatus according to the first modification replaces, with respect to each dust-showing chip part, dust-showing data thereof with no-dust-showing (in particular, favorable) data of its corresponding chip part whenever the no-dust-showing data is obtained/found. This can reduce, every time a scan is performed, the number of chip parts that need to be determined as showing or not showing dust, and hence can efficiently produce shading data having no tone jump.

[Second Modification]

In one or more embodiments, there may be provided an informing unit that warns a user of abnormality in the reading sensor 24 (e.g. warns a user of a malfunction of the reading sensor 24 and recommends replacing the reading sensor 24) if the determination at Step S102 or Step S202 is "YES" a predetermined number of times or more. Examples of the informing unit include: the operation display unit 30 that can display warnings; and an audio output unit (not illustrated) that can output warning alarms.

Thus, the image reading apparatus according to the second modification includes an informing unit (e.g. operation display unit 30) that warns a user of abnormality in the reader in response to the hardware processor determining that the reference member or the reader has dust a predetermined number of times. This can warn a user of, for example, a malfunction of the reading sensor 24 at an early stage, and hence can solve (e.g. fix) the malfunction of the reading sensor 24 while reducing waste in producing shading data.

[Third Modification]

In the first modification, if the determination at Step S206 is "YES" a predetermined number of times or more, and a difference between an average gray level of the dust-showing chip part in the initial shading data candidate and an average gray level of the corresponding chip part in the second white data obtained at Step S201 is a predetermined value or smaller, the arithmetic processor 27 may cause a display (operation display unit 30) to display a screen for a user to choose whether or not to replace data of the dust-showing pixel point in the initial shading data candidate with data of its corresponding pixel point in the second white data obtained at Step S201, namely to choose whether or not to perform data replacement in pixels instead of data replacement in chips. If a user chooses to perform data replacement in pixels, the arithmetic processor 27 performs data replacement in pixels.

Thus, in response to determining that the corresponding chip part in the second white data shows dust a predetermined number of times or more and determining that a difference between an average gray level of the dust-showing chip part in the first white data and an average gray level of the corresponding chip part in the second white data is a predetermined value or smaller, the hardware processor causes a display (operation display unit 30) to display a screen for a user to choose whether or not to replace data of the dust-showing pixel point in the first white data with data of a corresponding pixel point in the second white data corresponding to the dust-showing pixel point in the first white data. This allows a user to choose data replacement in chips by placing priority on restraining occurrence of a tone jump, or data replacement in pixels by placing priority on reducing the number of scans, and hence can produce shading data flexibly as the user desires.

[Forth Modification]

In the third modification, the arithmetic processor 27 causes a display (operation display unit 30) to display a screen for a user to choose whether or not to replace data of the dust-showing pixel point in the initial shading data candidate with data of its corresponding pixel point in the second white data obtained at Step S201. However, this is not a limitation. For example, the arithmetic processor 27 may automatically replace data of the dust-showing pixel point in the initial shading data candidate with data of its corresponding pixel point in the second white data obtained at Step S201 without causing the display to display the screen for a user. For example, the arithmetic processor 27 may perform data replacement in chips until the third time of "YES" at Step S206, and perform data replacement in pixels from the fourth time of "YES" at Step S206.

Thus, in response to determining that the corresponding chip part in the second white data shows dust a predetermined number of times or more and determining that a difference between an average gray level of the dust-showing chip part in the first white data and an average gray level of the corresponding chip part in the second white data is a predetermined value or smaller, the hardware processor replaces data of the dust-showing pixel point in the first white data with data of a corresponding pixel point in the second white data corresponding to the dust-showing pixel point in the first white data. This can reduce the number of scans and efficiently produce shading data accordingly.

[Fifth Modification]

In the first modification, if a plurality of dust-showing chip parts is present in the initial shading data candidate and a plurality of scans is performed, the arithmetic processor 27 replaces, with respect to each dust-showing chip part, dust-showing data thereof with no-dust-showing (in particular, favorable) data of its corresponding chip part whenever the no-dust-showing data is obtained/found. However, this is not a limitation. Instead of replacing dust-showing data with no-dust-showing data whenever the no-dust-showing data is obtained, the arithmetic processor 27 may replace, with respect to each dust-showing chip part, dust-showing data thereof with (favorable) data of its corresponding chip part having the minimum gray level difference from the dust-showing data (e.g. data the average gray level of which is different from the average gray level of the dust-showing data by three levels (in 8 bits) or less).

A fifth modification of the operation of the image reading unit 20 is described hereinbelow with reference to the flowchart in FIG. 5.

Figure 5:
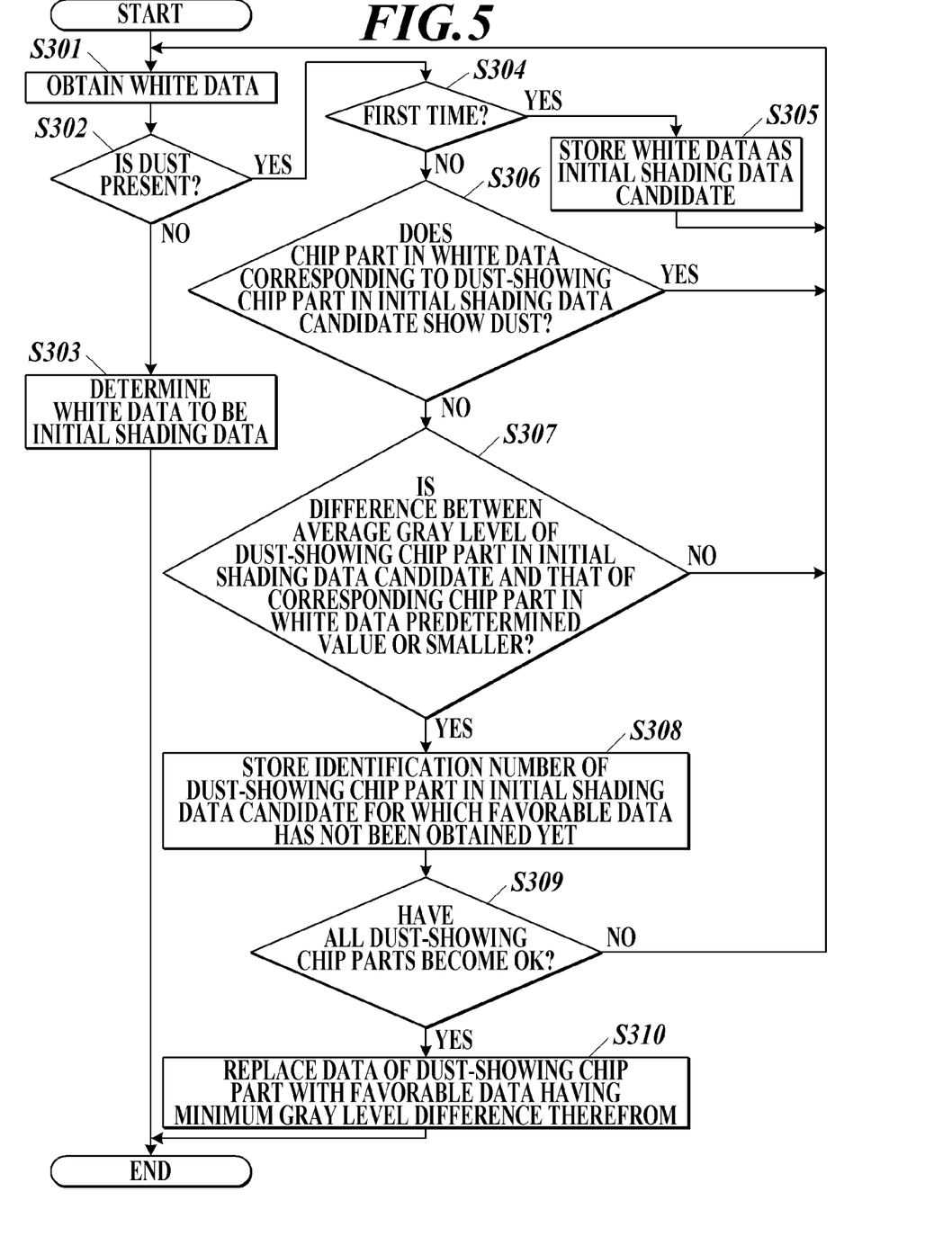
FIG. 5 is a flowchart showing a fifth modification of the operation of the image reading unit according to one or more embodiments.

Steps S301 to S307 in FIG. 5 are the same as Steps S201 to S207 in FIG. 3, and hence not described.

At Step S308, the arithmetic processor 27 temporarily stores, in the storage 26, an identification number(s) of a dust-showing chip part(s) in the initial shading data candidate for which a corresponding chip part(s) showing no dust and having an average gray level(s) different from that of the dust-showing chip part(s) by a predetermined value or less (e.g. three levels or less) (i.e. favorable data) has not been obtained yet (Step S308). The arithmetic processor 27 also temporarily stores in the storage 26: data indicating whether or not, for each dust-showing chip part in the initial shading data candidate, favorable data is obtained/found this time; and obtained/found favorable data.

Next, on the basis of the identification number(s) of the dust-showing chip part(s) stored at Step S308, the arithmetic processor 27 determines whether or not all the dust-showing chip parts in the initial shading data candidate have become OK (i.e. are ready to show no dust) (Step S309). More specifically, if none of the identification numbers of the dust-showing chip parts in the initial shading data candidate are stored at Step S308, the arithmetic processor 27 determines that all the dust-showing chip parts in the initial shading data candidate have become OK.

If the arithmetic processor 27 determines that all the dust-showing chip parts in the initial shading data candidate have become OK (Step S309: YES), the arithmetic processor 27 replaces, with respect to each dust-showing chip part, dust-showing data thereof with, among the favorable data of its corresponding chip part(s), favorable data having the minimum gray level difference from the dust-showing data of the dust-showing chip part (Step S310). After the replacement, the arithmetic processor 27 determines the initial shading data candidate to be initial shading data, stores the initial shading data in the storage 26 or the storage 50, and ends the initial shading data obtainment process.

If the arithmetic processor 27 determines that not all the dust-showing chip parts in the initial shading data candidate have become OK yet (Step S309: NO), the arithmetic processor 27 returns to Step S301.

As described above, in the image reading apparatus of the image forming apparatus 1 according to the fifth modification, in response to determining that the first white data includes a plurality of dust-showing chip parts each of which is the dust-showing chip part, the hardware processor replaces, with respect to each of the dust-showing chip parts, the data of the dust-showing chip part in the first white data with the data of the corresponding chip part in the second white data having the minimum gray level difference from the data of the dust-showing chip part in the first white data.

Thus, the image reading apparatus according to the fifth modification can minimize influence of gray level difference on images and minimize possibility of occurrence of streaks thereon accordingly.

[Sixth Modification]

In the fifth modification, the arithmetic processor 27 replaces, with respect to each dust-showing chip part, dust-showing data thereof with favorable data of its corresponding chip part having the minimum gray level difference therefrom. However, this is not a limitation. The arithmetic processor 27 may replace, with respect to each dust-showing pixel point, dust-showing data thereof with favorable data of its corresponding pixel point having the minimum gray level difference therefrom. In this case, the arithmetic processor 27 temporarily stores in the storage 26: data indicating whether or not, for each dust-showing pixel point in the initial shading data candidate, favorable data is obtained/found in each scan; and obtained/found favorable data.

Thus, in response to determining that the first white data includes a plurality of dust-showing pixel points based on which the hardware processor determines that the reference member or the reader has dust, the hardware processor replaces, with respect to each of the dust-showing pixel points, data of the dust-showing pixel point in the first white data with data of a corresponding pixel point in the second white data (i) corresponding to the dust-showing pixel point in the first white data and (ii) having the minimum gray level difference from the data of the dust-showing pixel point in the first white data. This can minimize influence of gray level difference on images and minimize possibility of occurrence of streaks thereon accordingly.

[Seventh Modification]

In one or more embodiments, if the determination at Step S102 is "YES" a predetermined number of times or more, the arithmetic processor 27 may change a threshold serving as a reference to determine whether or not the shading sheet 22 or the reading sensor 24 has dust. This threshold indicates a degree of gray level difference between pixels. A more lenient (greater) threshold results in more visible streaks on images to be formed. A user, as desires, can set a change timing of the threshold and a value to which the current threshold is changed.

Thus, the hardware processor changes a threshold serving as a reference to determine whether or not the reference member or the reader has dust in response to determining that the reference member or the reader has dust a predetermined number of times. This can reduce the number of scans and efficiently produce shading data accordingly.

The arithmetic processor 27 may automatically change the threshold on the basis of the number of times that the arithmetic processor 27 determines that the shading sheet 22 or the reading sensor 24 has dust. For example, the arithmetic processor 27 may set a strict threshold (i.e. low threshold) until the third time of "YES" at Step S102, and set a lenient threshold (i.e. high threshold) from the fourth time of "YES" at Step S102. Thus, the hardware processor changes the threshold based on the number of times that the hardware processor determines that the reference member or the reader has dust. This can reduce the number of scans and efficiently produce shading data accordingly.

Furthermore, when changing the threshold and starting obtaining white data again, the arithmetic processor 27 may not utilize but reset (e.g. delete) the white data obtained so far, and determine, as the first white data, white data that is obtained by the reading sensor 24 reading the shading sheet 22 first time after the arithmetic processor 27 changes the threshold.

Thus, in response to changing the threshold, the hardware processor resets the first white data and the second white data, and determines, as the first white data, white data that is obtained by the reader reading the reference member first time after the hardware processor changes the threshold. This can avoid mixture of white data obtained before and after changing the threshold and avoid occurrence of an error in data replacement accordingly.

[Eighth Modification]

In one or more embodiments, data are replaced in pixels. However, this is not a limitation. There may be provided patterns of a data replacement width in units of which data are replaced. The patterns may be changed each time a scan is performed to obtain white data, in order of one line, half a line, two chips, one chip, and one pixel.

Thus, the hardware processor changes a data replacement width in units of which the first white data, based on which the hardware processor determines that the reference member or the reader has dust, is replaced with the second white data in order of one line, half a line, two chips, one chip, and one pixel, each time the second white data is obtained. This can narrow the data replacement width, in units of which data are replaced, each time a scan is performed, and hence can satisfy both restraint of occurrence of a tone jump and reduction in the number of scans in a balanced manner.

Furthermore, in the first modification, if a no-dust-showing chip part (e.g. a chip part No. 4) is present between two dust-showing chip parts (e.g. chip parts No. 3 and No. 5) in the initial shading data candidate, data of the chip parts including the no-dust-showing chip part (i.e. data of consecutive three chip parts) may be replaced with new (no-dust-showing, in particular, favorable) data (second white data). In this case, the image reading apparatus may be configured such that its user can choose whether or not to replace data of the chip parts including the no-dust-showing part with new data (second white data).

Thus, in response to determining that the first white data includes a no-dust-showing chip part not including the dust-showing pixel point between two dust-showing chip parts each of which is the dust-showing chip part, the hardware processor replaces data of the two dust-showing chip parts and the no-dust-showing chip part in the first white data with data of corresponding chip parts in the second white data corresponding to the two dust-showing chip parts and the no-dust-showing chip part in the first white data. This can replace data of a large block including the no-dust-showing chip part, which need not be replaced, and consequently restrain occurrence of a tone jump.

Furthermore, in one or more embodiments, the arithmetic processor 27 may automatically determine whether or not data are replaceable according to each of the patterns of the data replacement width (one line, half a line, two chips, one chip, and one pixel), by using white data obtained by one scan, thereby searching for a data replaceable width in units of which data are replaceable. The arithmetic processor 27 searches for the data replaceable width by changing the data replacement width in order of one line, half a line, two chips, one chip, and one pixel.

Thus, the hardware processor searches for a data replaceable width in units of which the first white data, based on which the hardware processor determines that the reference member or the reader has dust, is replaceable with the second white data, by using the second white data obtained by the reader additionally reading the reference member first time. This can reduce the number of scans and efficiently produce shading data accordingly.

Furthermore, in one or more embodiments, the arithmetic processor 27 may automatically change the data replacement width on the basis of the number of times that the determination at Step S102 is "YES". For example, the arithmetic processor 27 sets, as the data replacement width, "one line" until the second time of "YES" at Step S102, "half a line" for the third time of "YES" thereat, "two chips" for the fourth time of "YES" thereat, "one chip" for the fifth time of "YES" thereat, and "one pixel" from the sixth time of "YES" thereat.

Thus, the hardware processor changes a data replacement width in units of which the first white data, based on which the hardware processor determines that the reference member or the reader has dust, is replaced with the second white data based on the number of times that the hardware processor determines that the reference member or the reader has dust. This can narrow the data replacement width each time a scan is performed, and hence can satisfy both restraint of occurrence of a tone jump and reduction in the number of scans in a balanced manner.

Furthermore, in one or more embodiments, the arithmetic processor 27 produces ideal initial white reference data on the basis of white data obtained by the reading sensor 24 reading the shading sheet 22. However, this is not a limitation. For example, the arithmetic processor 27 may produce ideal initial black reference data on the basis of black data obtained by the reading sensor 24 reading the shading sheet 22. The black data can be obtained by using the shading sheet 22, for example, by reading the shading sheet 22 in darkness with the light source 21 turned off, or by using input data of pixels that are shielded from light.

Thus, the hardware processor further: based on first black data that is obtained by the reader reading the reference member, determines whether or not the reference member or the reader has dust; in response to determining that the reference member or the reader has dust, produces ideal initial black reference data by complementing the first black data with second black data that is obtained by the reader additionally reading the reference member; and with the produced ideal initial black reference data, complements third black data that is obtained by the reader reading the reference member right before reading an image of a job. This enables shading correction with not only ideal initial white reference data but also ideal initial black reference data, and consequently can improve quality of images.

The detailed configuration and detailed operation of each apparatus, unit, or the like of the image forming apparatus can be appropriately modified without departing from the scope of the present invention.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An image reading apparatus comprising:
   a light source that emits light;
   a reference sheet that reflects the light emitted from the light source;
   a light-receiving lens that converges the light reflected from the reference sheet;
   a reading sensor that reads the light converged by the light-receiving lens; and
   a hardware processor that:
      based on first white data obtained when the reading sensor reads the reference sheet for the first time, determines whether the reference sheet or the reading sensor has dust;
      in response to determining that the reference sheet or the reading sensor has dust, produces ideal initial white reference data by complementing the first white data with second white data obtained when the reading sensor reads the reference sheet for the second and subsequent times; and
      with the ideal initial white reference data, complements third white data obtained when the reading sensor reads the reference sheet right before reading an image of a job.

2. The image reading apparatus according to claim 1, wherein
   the hardware processor:
      determines whether a corresponding region in the second white data shows dust, wherein:
         the corresponding region corresponds to a dust-showing region in the first white data,
         the dust-showing region includes a dust-showing pixel point, and
         based on the dust-showing pixel point, the hardware processor determines that the reference sheet or the reading sensor has dust; and
      in response to determining that the corresponding region shows no dust, replaces data of the dust-showing region with data of the corresponding region, and
   the reading sensor includes a plurality of chips.

3. The image reading apparatus according to claim 2, wherein in response to determining that a difference between an average gray level of the dust-showing region and an average gray level of the corresponding region is a predetermined value or a value smaller than the predetermined value, the hardware processor further replaces the data of the dust-showing region with the data of the corresponding region.

4. The image reading apparatus according to claim 2, wherein the hardware processor further causes a display to display a screen for choosing whether to replace data corresponding to a dust-showing pixel point in the first white data with data of a corresponding pixel point in the second white data in response to:
   determining that the corresponding region shows dust a predetermined number of times or more, and
   determining that a difference between an average gray level of the dust-showing region and an average gray level of the corresponding region is a predetermined value or a value smaller than the predetermined value, wherein the corresponding pixel point corresponds to the dust-showing pixel point in the first white data.

5. The image reading apparatus according to claim 2, wherein the hardware processor further replaces data corresponding to a dust-showing pixel point in the first white data with data of a corresponding pixel point in the second white data in response to:
determining that the corresponding region shows dust a predetermined number of times or more, and
determining that a difference between an average gray level of the dust-showing region and an average gray level of the corresponding region is a predetermined value or a value smaller than the predetermined value, wherein the corresponding pixel point corresponds to the dust-showing pixel point in the first white data.

6. The image reading apparatus according to claim 2, wherein in response to determining that the first white data includes a plurality of the dust-showing region and whenever the second white data is obtained, the hardware processor replaces the data of the dust-showing region with the data of the corresponding region determined as showing no dust.

7. The image reading apparatus according to claim 2, wherein in response to determining that the first white data includes a plurality of the dust-showing region, the hardware processor further replaces the data of the dust-showing region with the data of the corresponding region that has a minimum gray level difference from the data of the dust-showing region.

8. The image reading apparatus according to claim 2, wherein in response to determining that the first white data includes a no-dust-showing region between two of the dust-showing region, the hardware processor further replaces data of the two dust-showing region and the no-dust-showing region with data of the corresponding region that corresponds to the two dust-showing region and the no-dust-showing region, wherein the no-dust-showing region is a part of the first white data that does not include dust.

9. The image reading apparatus according to claim 1, wherein in response to determining that the first white data includes a plurality of dust-showing pixel points, based on the dust-showing pixel points the hardware processor determines that the reference sheet or the reading sensor has dust, and the hardware processor replaces data of each of the dust-showing pixel points in the first white data with data of a corresponding pixel point in the second white data, wherein the corresponding pixel point in the second white data:
(i) corresponds to the each of the dust-showing pixel points, and
(ii) has a minimum gray level difference from the data of each of the dust-showing pixel points.

10. The image reading apparatus according to claim 1, further comprising an informing unit that warns a user of an abnormality in the reading sensor in response to the hardware processor determining a predetermined number of times that the reference sheet or the reading sensor has dust.

11. The image reading apparatus according to claim 1, wherein in response to determining that the reference sheet or the reading sensor has dust a predetermined number of times, the hardware processor further changes a threshold that determines whether the reference sheet or the reading sensor has dust.

12. The image reading apparatus according to claim 11, wherein the hardware processor further changes the threshold based on a number of times that the hardware processor determines that the reference sheet or the reading sensor has dust.

13. The image reading apparatus according to claim 11, wherein in response to changing the threshold, the hardware processor further:
resets the first white data and the second white data, and
replaces the first white data with white data obtained when the reading sensor reads the reference sheet for the first time after the hardware processor changes the threshold.

14. The image reading apparatus according to claim 1, wherein
the hardware processor further changes a data replacement width in order of one line, half a line, two chips, one chip, and one pixel, each time the second white data is obtained,
the data replacement width is a unit used when replacing the first white data with the second white data, and
based on the first white data, the hardware processor determines that the reference sheet or the reading sensor has dust.

15. The image reading apparatus according to claim 1, wherein
the hardware processor further searches for a data replaceable width using the second white data obtained when the reading sensor reads the reference sheet for the second time,
the data replaceable width is a unit used when replacing the first white data with the second white data, and
based on the first white data, the hardware processor determines that the reference sheet or the reading sensor has dust.

16. The image reading apparatus according to claim 1, wherein
the hardware processor further changes a data replacement width based on a number of times that the hardware processor determines that the reference sheet or the reading sensor has dust,
the data replacement width is a unit used when replacing the first white data with the second white data, and
based on the first white data, the hardware processor determines that the reference sheet or the reading sensor has dust.

17. The image reading apparatus according to claim 1, wherein the hardware processor further:
based on first black data obtained when the reading sensor reads the reference sheet for the first time, determines whether the reference sheet or the reading sensor has dust;
in response to determining that the reference sheet or the reading sensor has dust, produces ideal initial black reference data by complementing the first black data with second black data obtained when the reading sensor reads the reference sheet for the second and subsequent times; and
with the ideal initial black reference data, complements third black data obtained when the reading sensor reads the reference sheet right before reading the image of the job.

18. An image forming apparatus comprising:
the image reading apparatus according to claim 1; and
an image former that forms, on paper, an image of a document read by the reading sensor.

19. A reading control method for an image reading apparatus including: a light source that emits light; a reference sheet that reflects the light emitted from the light source; a light-receiving lens that converges the light reflected from the reference sheet; and a reading sensor that reads the light converged by the light-receiving lens, the method comprising:

based on first white data obtained when the reading sensor reads the reference sheet for the first time, determining whether the reference sheet or the reading sensor has dust;

in response to determining that the reference sheet or the reading sensor has dust, producing ideal initial white reference data by complementing the first white data with second white data obtained when the reading sensor reads the reference sheet for the second and subsequent times; and     with the ideal initial white reference data, complementing third white data obtained when the reading sensor reads the reference sheet right before reading an image of a job.

\* \* \* \* \*